(12) United States Patent
Jun

(10) Patent No.: US 6,340,029 B1
(45) Date of Patent: Jan. 22, 2002

(54) APPARATUS FOR OPENING/CLOSING A VALVE AND METHOD THEREOF

(76) Inventor: Duk-Jo Jun, 701-2202 World Apt., 1346 Sadong, Ansan, Kyungki-do (KR)

(*) Notice: Subject to any disclaimer, the term of this patent is extended or adjusted under 35 U.S.C. 154(b) by 0 days.

(21) Appl. No.: 09/492,537

(22) Filed: Jan. 27, 2000

(30) Foreign Application Priority Data

Jan. 26, 1999 (KR) .............................................. 99-2467
Jan. 24, 2000 (KR) .............................................. 00-3219

(51) Int. Cl.[7] .............................................. F16K 25/00
(52) U.S. Cl. ............................. 137/1; 251/170; 251/172
(58) Field of Search ................................. 251/172, 170, 251/173, 175, 187, 188, 192; 137/1

(56) References Cited

U.S. PATENT DOCUMENTS

| | | | | | |
|---|---|---|---|---|---|
| 3,912,220 A | * | 10/1975 | Vasicek et al. | ......... | 251/177 X |
| 4,226,258 A | * | 10/1980 | Nakanishi | ............... | 251/172 X |
| 5,533,738 A | * | 7/1996 | Hoffmann | ............... | 251/172 X |
| 6,213,450 B1 | * | 4/2001 | Palmer | ....................... | 251/170 |

* cited by examiner

*Primary Examiner*—Kevin Lee
(74) *Attorney, Agent, or Firm*—Robert E. Bushnell, Esq.

(57) ABSTRACT

A method and an apparatus for opening/closing a valve are provided. The method includes the steps of varying a position of a seat assembled into an inner side of a fluid passage of a valve body using a pneumatic pressure or a magnetic force so as to be separated from a turning radius of a valve member for opening/closing the fluid passage, rotating the valve member in a forward or reverse direction by an actuator, rotating the valve member in the forward direction and opening the fluid passage, rotating the valve member in the reverse direction, and returning the position of the seat so that an inner side of the seat is sealingly contacted with an outer face of the valve member and closing the fluid passage.

20 Claims, 17 Drawing Sheets

APPARATUS FOR OPENING/CLOSING A VALVE AND METHOD THEREOF

CLAIM OF PRIORITY

This application makes reference to incorporates the same herein, and claims all benefits accruing under 35 U.S.C. §119 from applications for A METHOD FOR MAINTAINING A SEAT LIFE OF A BUTTERFLY VALVE AND AN APPARATUS THEREOF earlier filed in the Korean Industrial Property Office on the 26$^{th}$ of Jan. 1999 and there duly assigned Ser. No. 2467/1999, and for METHOD AND APPARATUS FOR OPENING AND CLOSING OF BALL VALVE earlier filed in the Korean Industrial Property Office on the 24$^{th}$of Jan. 2000 and there duly assigned Ser. No. 3219/2000.

BACKGROUND OF THE INVENTION

1. Field of the Invention

The present invention relates to an apparatus and a method for opening/closing a valve, and more particularly, an apparatus and a method for opening/closing a valve, in which a position of a seat for maintaining an airtightness of a valve member is varied before or after an opening/closing operation of the valve member, wherein the valve member is rotated in a fluid passage of a valve body in order to open/close a valve.

2. Description of the Related Art

Generally, a ball type valve or a disk type valve is provided a valve seat which is made of a rubber and a Teflon resin or other elastic material. The valve seat is assembled into a fluid passage of a valve body. And a valve member such as a ball or a disk is rotatably mounted by a rotational shaft in an inner side of the valve seat. The shaft is connected with an actuator for driving the shaft so as to open/close the fluid passage by the operation of the actuator.

In this case, however, since an outer face of the valve member is contacted with the valve seat upon the opening/closing operation of the valve member, if the opening/closing operation of the valve member is repeatedly performed over a long time, a partial side wear is occurred in the valve seat. Therefore, an airtightness between the valve member and the valve seat is not maintained, thereby occurring a defect in the valve.

Further, since the valve seat is sealingly contacted with the outer face of the valve member in order to maintain the airtightness between the valve seat and the valve member, the valve member can not facilely rotated to open/close the valve upon the opening/closing operation of the valve member due to a friction force between the outer face of the valve member and an inner face of the valve seat.

SUMMARY OF THE INVENTION

It is therefore an object of the present invention to extend the life span of the valves seat and maintain the airtightness of the ball valve.

It is other object of the present invention to enable the ball valve to be driven by a weak driving force.

To achieve the above objects and other advantages, there is provided a method for opening/closing a valve including the steps of varying a position of a seat assembled into an inner side of an open passage of a valve body so as to be separated from a turning radius of a valve member for opening/closing the fluid passage, rotating the valve member in a forward or reverse direction by an actuator, rotating the valve member in the forward direction and opening the fluid passage, rotating the valve member in the reverse direction, and returning the position of the seat so that an inner side of the seat is sealingly contacted with an outer face of the valve member and closing the fluid passage.

The seat is fixed to a seat sliding guide, and the position of the seat is varied by a movement of the seat sliding guide using a pneumatic pressure. The seat is fixed to a seat sliding guide, and a magnetic member is provided in a side of the seat sling guide and the valve body and a side cover so that the position of the seat is varied by a magnetic force of the magnetic member.

Preferably, the seat is fixed to a seat sliding guide, a magnetic member is provided in a side of the seat sling guide and the valve body and a side cover so that the position of the seat is varied by a magnetic force of the magnetic member.

The valve includes a valve body, a seat supported by a side cover and assembled in an open passage of the valve body, an opening/closing ball rotatably mounted via a rotational shaft to an inner side of the seat and rotated in a forward or reverse direction by an actuator connected with the rotational shaft so that the valve is opened or closed first and second air supplying passages formed on the valve body, and a ring-shaped air passage communicated with the first and second air supplying passage and provided in an inner side of the valve body, wherein the seat is mounted to the valve body so as to be spaced-apart at a desired distance, and an airtightness of the ring-shaped air passage is maintained by a O-ring.

The valve includes a plurality of permanent magnets respectively provided in one side of one of the first and second air passages, one side of the valve body and a side of the seat sliding guide corresponding to the valve body.

The valve includes a valve body, a seat supported by a side cover and assembled in an open passage of the valve body, and an opening/closing ball rotatably mounted via a rotational shaft to an inner side of the seat and rotated in a forward or reverse direction by an actuator connected with the rotational shaft coupled to the ball so that the valve is opened or closed, wherein the valve body is formed with a ring-shaped air passage, the seat and seat sliding guide are mounted to the ring-shaped air passage so as to be apart from the valve at a desired distance, a plurality of permanent magnets are provided on both sides of the seat sliding guide, in which the seat is fixed, so that polarities of the permanent magnets adjacent to each other are different and also other permanent magnets are provided on an outer face of the valve body and an inner side of the side cover, which are correspondent with the permanent magnets of the seat sliding guide so that polarities of the permanent magnets adjacent to each other are different.

The valve apparatus includes a valve body, a seat supported by a circular cover ring and assembled in an open passage of the valve body, and an opening/closing disk rotatably mounted via a rotational shaft to an inner side of the seat and rotated in a forward or reverse direction by an actuator connected with the rotational shaft coupled to the disk so that the valve is opened or closed, wherein the valve body is provided with a first and second air supplying passage, a ring-shaped air passage communicated with the first and second air supplying passage is provided in an inner side of the valve body, the seat is mounted to the valve body so as to be apart at a desired distance and an airtightness of the ring-shaped air passage is maintained by a O-ring.

Preferably, the apparatus according to the present invention further comprises an elastic member which is provided in one side out of the first and second air passage and between the valve body and seat or between the circular cover ring and the seat.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

The present invention now will be described more fully hereinafter with reference to the accompanying drawings, in which preferred embodiments of the invention are shown.

Figure 1:
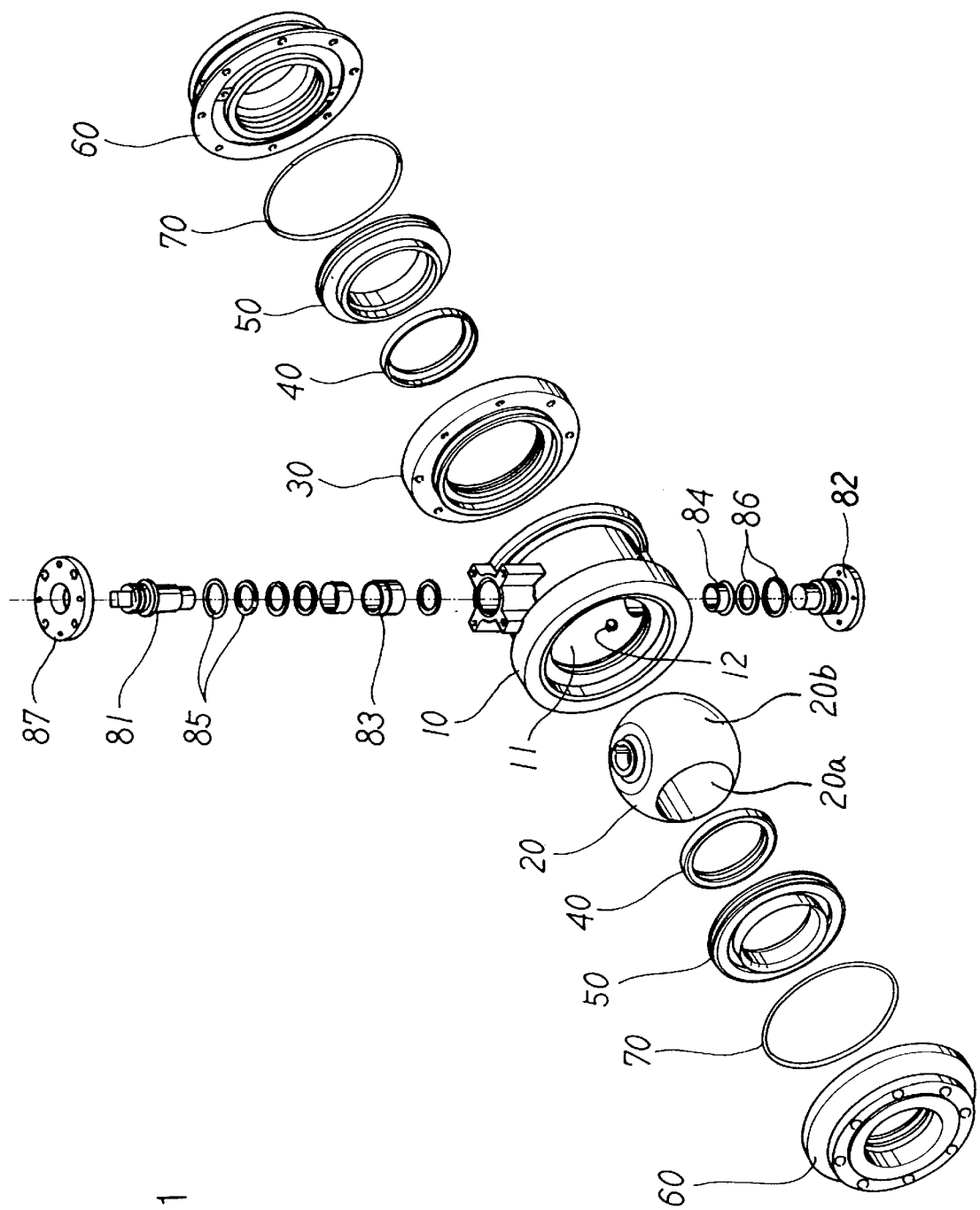
FIG. 1 is an exploded perspective view showing a construction of a ball type valve according to the present invention.
Figure 2:
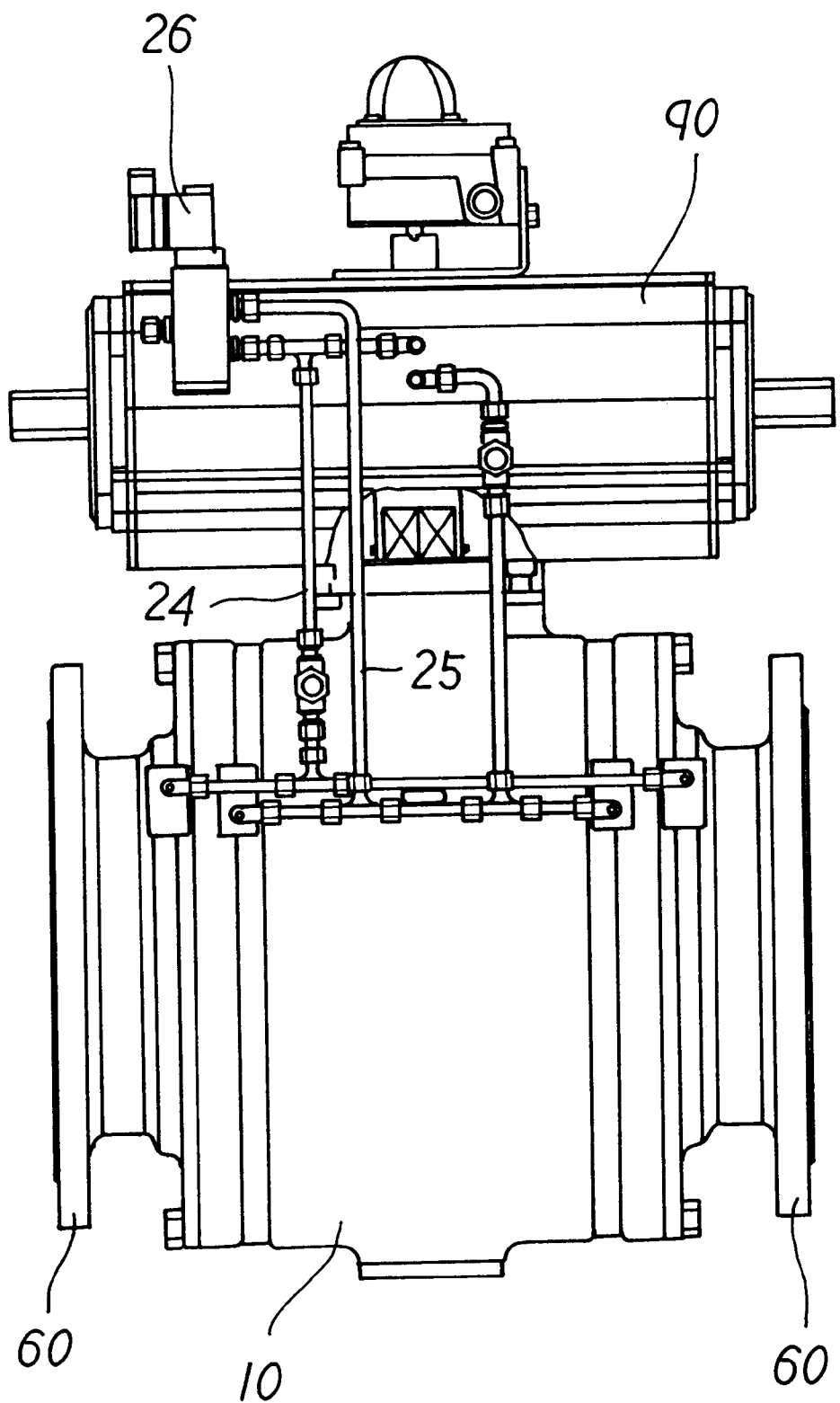
FIG. 2 is a side view showing a construction of a ball type valve according to the present invention.
Figure 3:
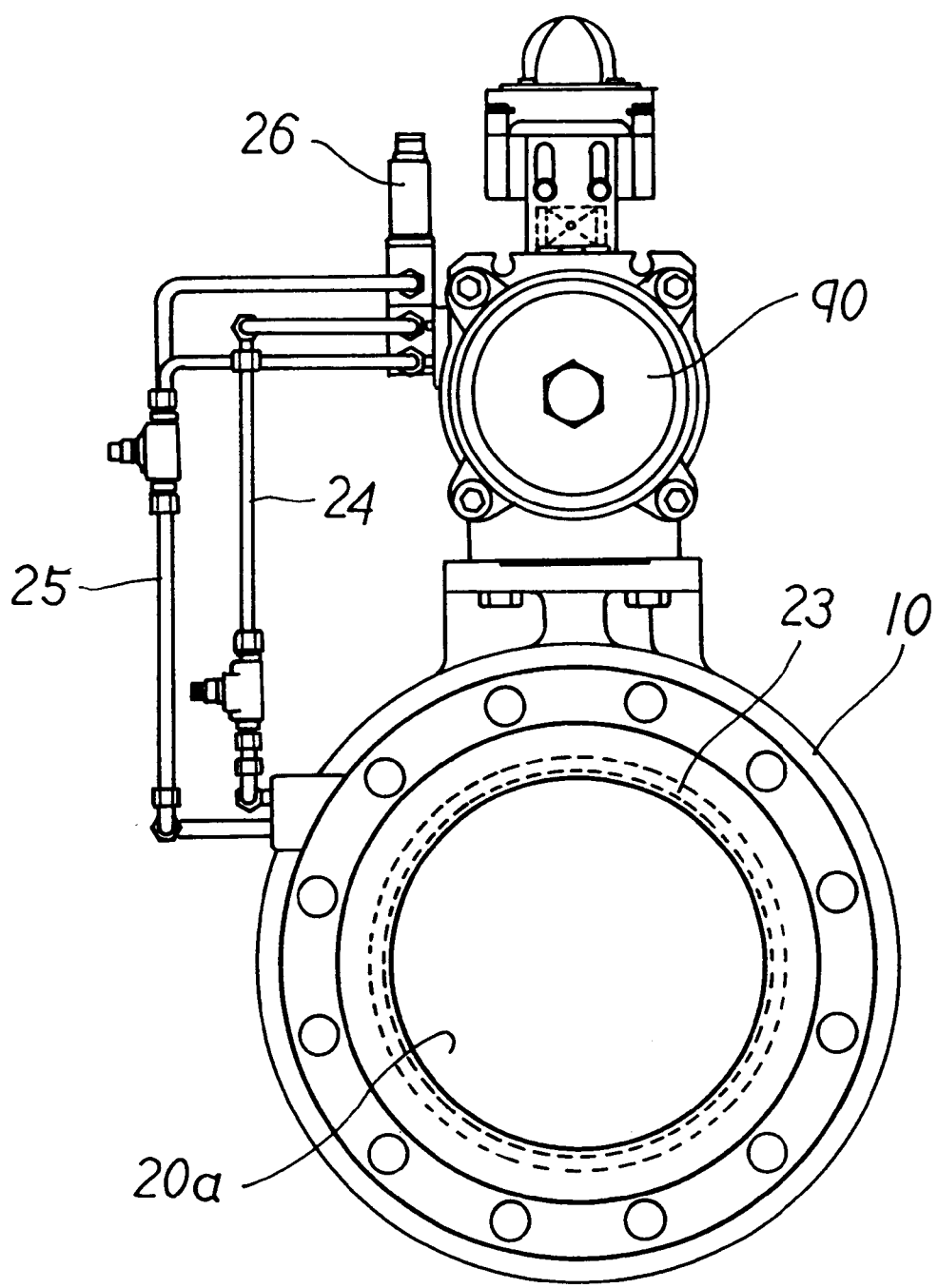
FIG. 3 is a front view showing a construction of a ball type valve according to the present invention.
Figure 4:
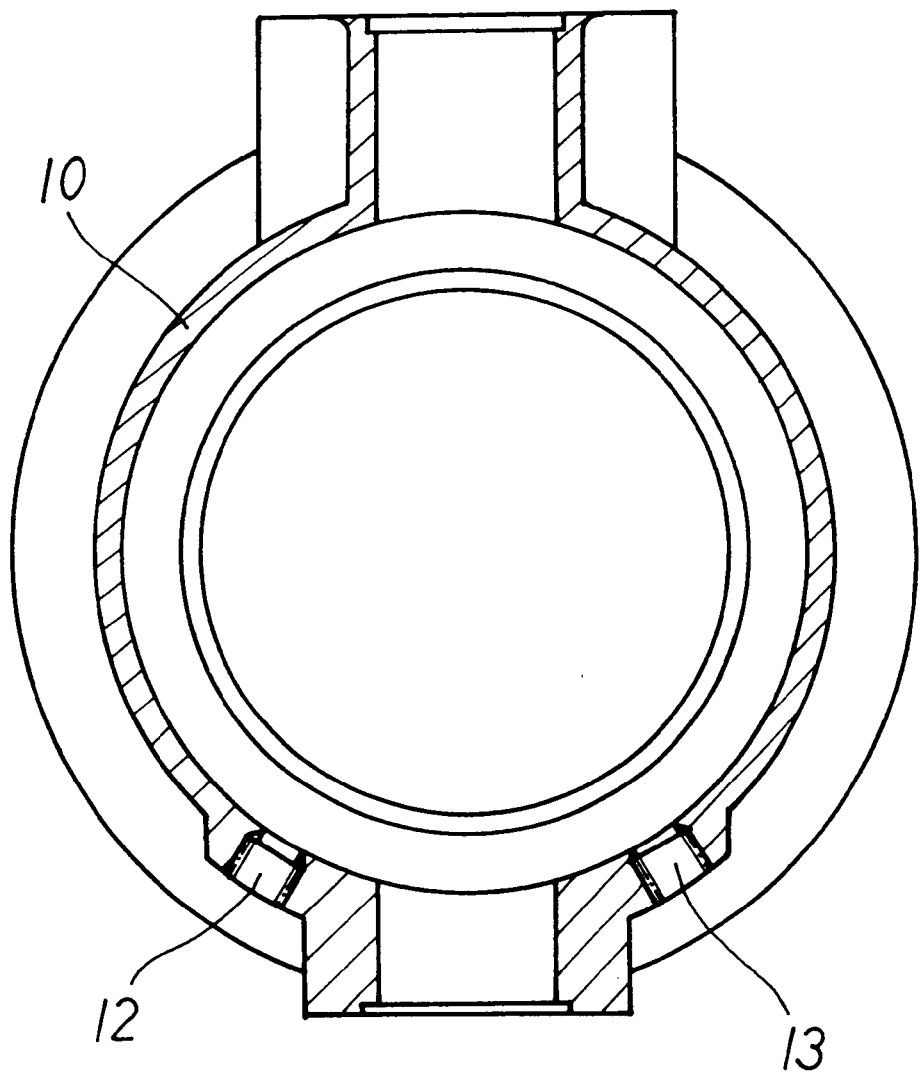
FIG. 4 is a cross-sectional view of a valve body in FIG. 1.

FIG. 1 is an exploded perspective view of a ball typed valve according to one embodiment of the present invention, FIG. 2 is a side view of ball typed valve, FIG. 3 is an elevational view, and FIG. 4 is a sectional view of valve body.

Referring to FIGS. 1–4, the ball typed valve includes a valve body 10 having an open passage 11 formed at the inside of the body 10 along the length direction of the body 10, an opening/closing ball 20 inserted into the inside of the open passage 11 of the valve body 10, having a fluid passage 20a formed along a specific direction, and opening or closing the open passage 11 of the valve body 10 by communicating the fluid passage 20a with both sides of the open passage 11 of the body 10 and shutting off the open passage 11 of the valve body 10, a mid-cover 30 coupled to a rear side 17 of the open passage 11 of the body 10, a seat 40 respectively coupled to a front side 16 and a rear side 18 of the open passage 11 of the valve body 10 spaced-apart by a selected distance from the outer surface 20b of the opening/closing ball 20, and a seat sliding guide 50 coupled to the seat 40 from outward direction of the seat 40 for guiding a position of the seat 40. An O-ring 70 is disposed between the seat sliding guide 50 and a side cover 60.

Upper and lower stems 81 and 82 act as a rotating shaft rotating the opening/closing ball 20 about an axis passing through a center line of the upper and lower stems 81 and 82 and are respectively coupled to upper and lower couplers 21A and 21B formed on the opening/closing ball 20 from the upper and lower portions of the valve body 10. Bush bearings 83 and 84 for assisting the rotation of the upper and lower stems 81 and 82 and O-rings 85 and 86 for preventing the leakage of fluid are coupled to the stems 81 and 82. A mounting plate 87 is coupled to the upper stem 81, and an actuator 90 rotating the stems 81 and 82 coupled to the opening/closing ball 20 is fixed to the mounting plate 87 as shown in FIG. 2.

As shown in FIGS. 1 and 4, the valve body 10 has at least two exhausting holes 12 and 13 penetrating two selected portions of the valve body 10. The two exhausting holes 12 and 13 exhaust particles accumulated inside of the valve body 10 to the outside of the valve body 10. Mid and side covers 30 and 60 are respectively coupled to the valve body 10.

Figure 7A:
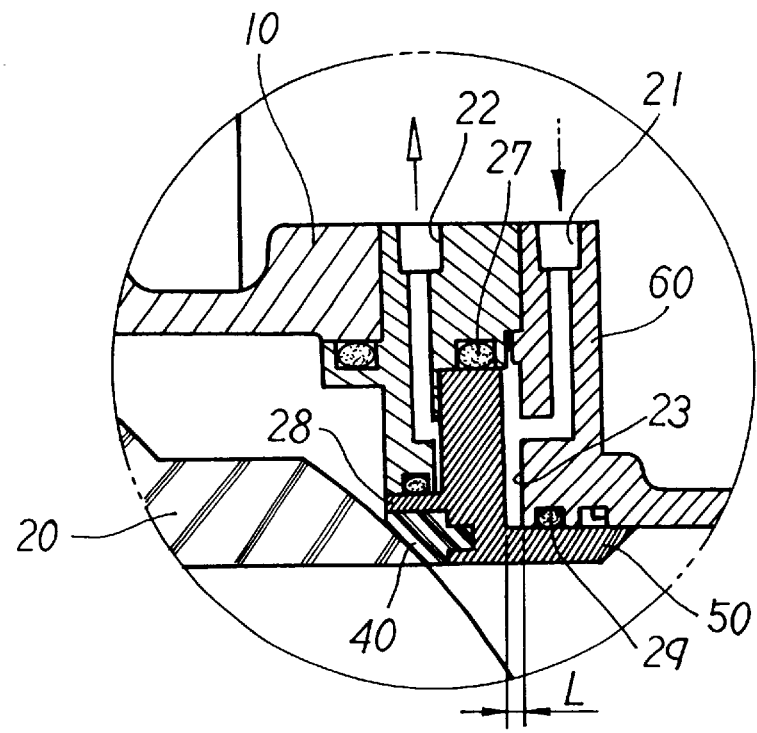
FIG. 7A is a partially enlarged view showing a state that a opening/closing ball is closely contacted with the valve seat.
Figure 7B:
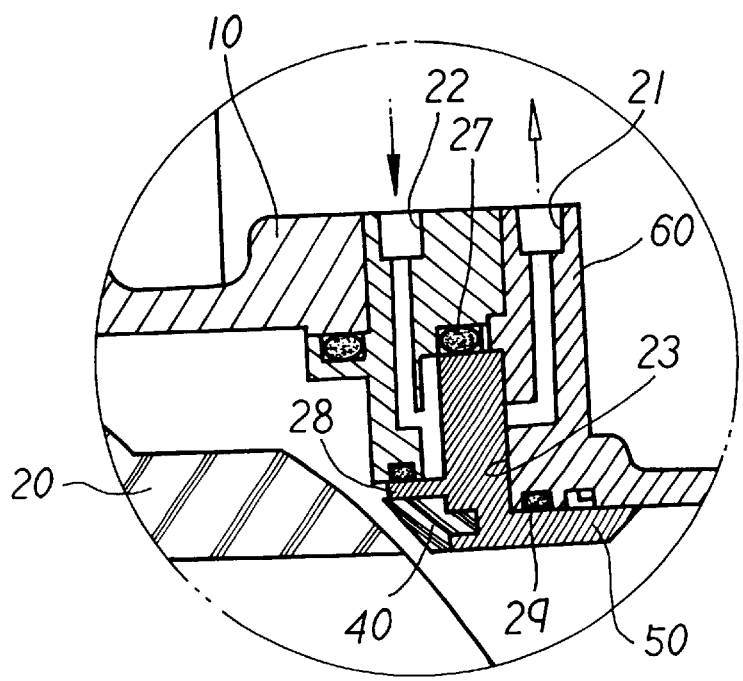
FIG. 7B is a partially enlarged view showing a state that the valve seat is varied so as to be separated from a turning radius of the opening/closing ball.
Figure 7C:
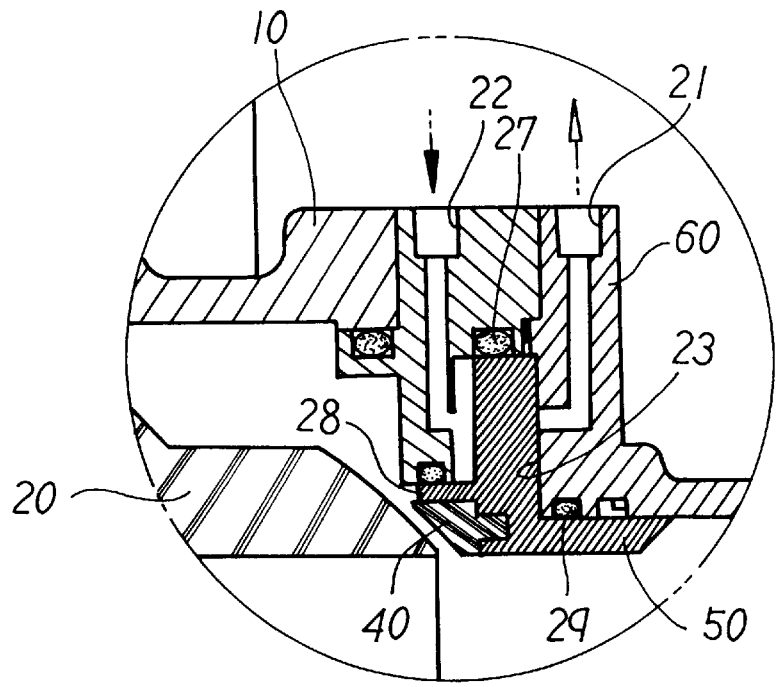
FIG. 7C is a partially enlarged view showing a state that the opening/closing ball is rotated so as to open the valve.

By assembling the opening/closing ball 20 within the open passage 11 of the valve body 10, a ring-shaped air passage 23 is formed between the mid-cover 30 and the side cover 60 as shown in FIG. 3. The first air supply path 21 is formed on the side cover 60 and connected to the air passage 23 and the air pipe 24 while the second air supply path 22 is formed on the mid-cover 30 and connected to the air passage 23 and the air pipe 25. In order to supply air into the air passage 23 and exhaust air from the air passage 23, first and second air supply paths 21 and 22 are disposed along both sides of a seat assembly having the seat 40 and the seat sliding guide 50 at a connecting portion with air pipes 24 and 25 as shown in FIGS. 7a–7c. The first and second air supply paths 21 and 22 are communicated with the ring-shaped air passage 23. The seat assembly is disposed within the air passage 23 and between the first and second air supply paths 21 and 22 to move toward and from the ball 20 by the supply of air to one of the first and second air supply paths 21 and 22. The first and second air supply paths 21 and 22 are coupled to an air pump (not shown) through the air pipes 24 and 25.

Referring to FIG. 3, the first and second air pipes 24 and 25 are connected to a solenoid valve 26 for switching the supply direction of air. The seat 40 is supported by the seat sliding guide 50 and is spaced-apart by a separating distance "L" from the opening/closing ball 20 during the assembly of the valve. The ring-shaped air passage 23 maintains a seal with the seat 40 by O-shaped rings 27, 28 and 29.

The seat 40 is supported by the seat sliding guide 50 and is apart by a separating distance "L" from the opening/closing ball 20 during the assembly of the valve. The ring-shaped air passage 23 maintains a seal with the seat 40 by O-shaped rings 27, 28 and 29.

Figure 5:
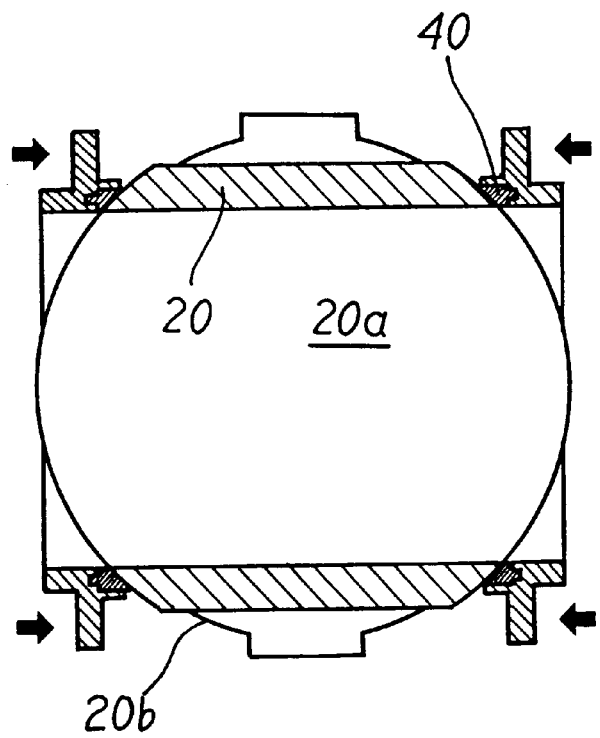
FIG. 5 is a cross-sectional view showing an open state of the ball valve in FIG. 1.

The opening operation of the ball typed valve having the above constitution is as follows. FIG. 5 is a partial cross-sectional view of the opening/closing ball and the seat assembly moving along the flow direction A of the air, and FIG. 7a is a partial detailed view showing a state that the valve is closed. As shown in FIGS. 3, 5 and 7a, as the valve is closed, air is supplied through the first air pipe 24 to the first air supply path 21. At this time, the seat sliding guide 50 pushes the seat 40 toward the opening/closing ball 20. Accordingly, the seat sliding guide 50 is separated by selected distance L from the side cover 60.

FIG. 5 is a sectional view of the opening/closing ball and adjacent portions thereof taken along the flow direction of the air and FIG. 7a is a partial detailed view showing a state that the valve is closed.

As shown in FIGS. 3, 5 and 7a, as the valve is closed, air is supplied through the first air pipe 24 to the first air supply path 21. At this time, the seat sliding guide 50 pushes the seat 40 toward the opening/closing ball 20. Accordingly, the seat sliding guide 50 is separated by selected distance L from the side cover 60.

In order to open the valve, the solenoid valve 26 is firstly operated and changes the supply direction of air. As a result, air is supplied to the second air supply path 22 through the second air pipe 25. The air supplied to the second air supply path 22 pushes the seat sliding guide 50 toward the external direction B and thereby the width of the air passage 23 decreases as shown in FIG. 7b.

As a result, the seat 40 supported and coupled to the seat sliding guide 50 is separated from the surface of the opening/closing ball 20 and moved by the corresponding distance L toward the external direction B. Accordingly, the seat 40 becomes spaced-apart from the opening/closing ball 20.

Figure 6:
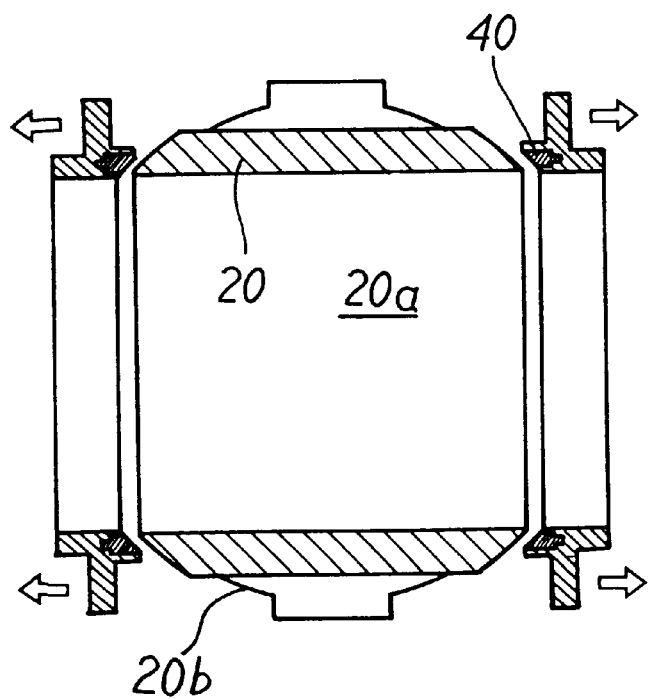
FIG. 6 is a cross-sectional view showing a closed state of the ball valve in FIG. 1.

Thus, the stems 81 and 82 of FIG. 1 are rotated by the operation of the actuator 90 of FIGS. 2 and 3 during a separation between the surface of the opening/closing ball 20 and the seat 40, and the opening/closing ball 20 is also rotated clockwise by the rotation of the stem 81, to thereby open the open passage 11 of the valve body 10 as shown in FIGS. 6b and 7c.

The closing operation of the ball typed valve is as follows. As shown in FIG. 7b, in a state that the seat 40 is separated from the surface 20b of the opening/closing ball 20, as the stems 81 and 82 rotate counterclockwise about an axis passing through a center of the stems 81, 82, the opening/closing ball 20 also rotates counterclockwise about the axis and thereby the outer surface 20b of the opening/closing ball 20 blocks the open passage 11 of the valve body 10.

As shown in FIG. 7b, in a state that the seat 40 is separated from the surface of the opening/closing ball 20, as the stems 81 and 82 is rotated counterclockwise, the opening/closing ball 20 is also rotated counterclockwise and thereby the outer surface of the opening/closing ball 20 blocks the fluid passage 11 of the valve body 10.

After that, the solenoid valve 26 changes the air supply direction from arrows C, D to arrows E, F. As a result, air supplied to the second air supply path 22 through the second air pipe 25 is blocked while air is supplied to the first air supply path 21 through the first air pipe 24, to thereby move the seat sliding guide 50 toward the internal direction A of the valve body 11. The seat 40 supported by and coupled to the seat sliding guide 50 sealingly contacts the outer surface 20a of the opening/closing ball 20 which is being rotated as shown in FIGS. 5 and 7a. As a result, the closing state of the open passage 11 of the valve body 10 is maintained.

Meanwhile, as the fluid passage 20a of the opening/closing ball 20 is exposed to the inside of valve body 10 during the opening or closing operation of the ball typed valve, fluid may be introduced between an inner wall 13 of the valve body 10 and the outer surface 20b of the opening/closing ball 20. Resultantly, particles contained in the introduced fluid may remain therebetween. These particles act as an obstacle hindering the opening and closing movement of the valve. In order to effectively exhaust these particles, the two exhausting holes 12 and 13 are formed at the lower portions of the inner wall 13 of the valve body 10 as shown in FIG. 4.

Figure 8:
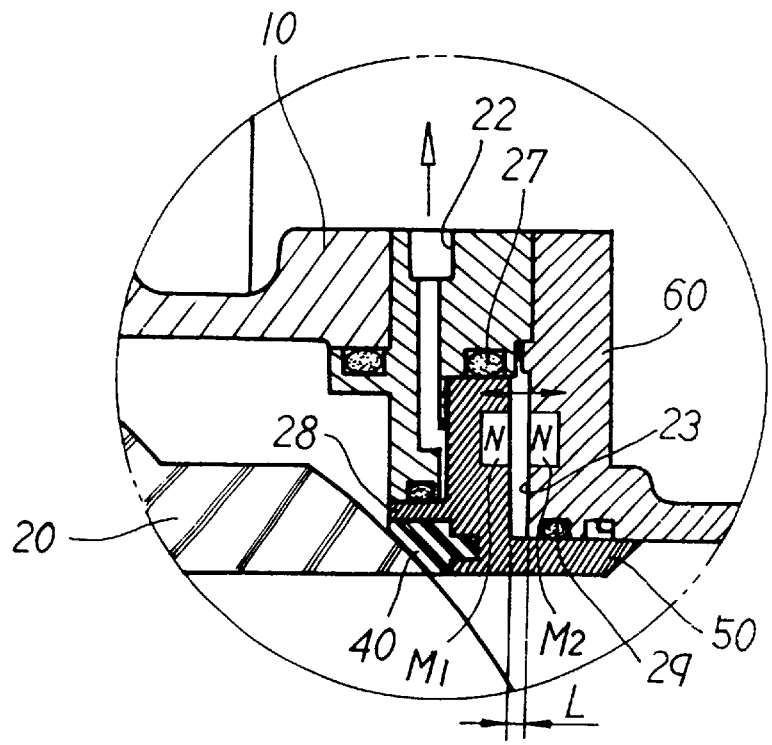
FIG. 8 is a partially enlarged view showing other embodiment of the ball valve according to the present invention.
Figure 9:
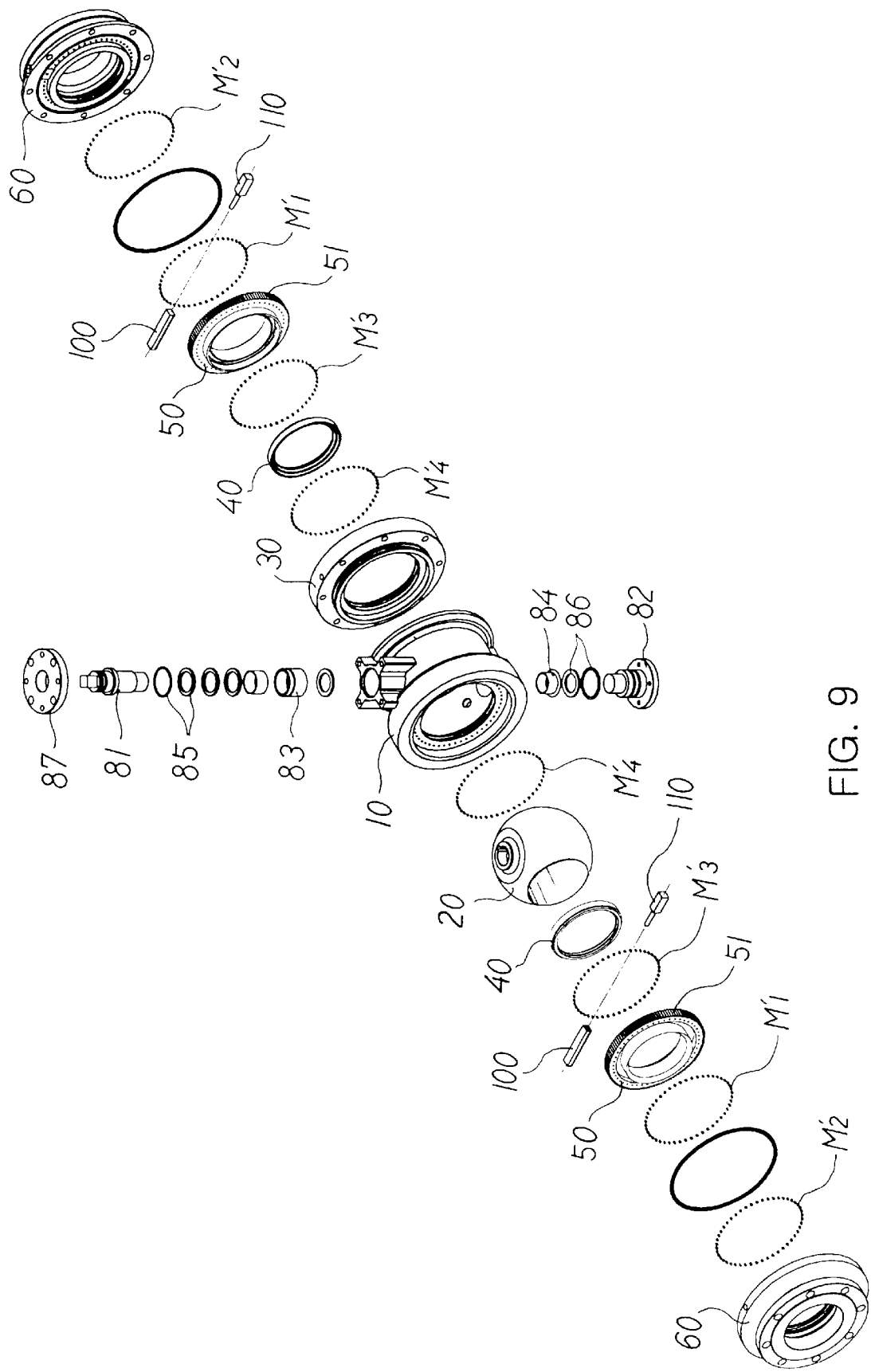
FIG. 9 is an exploded perspective view showing a construction of another embodiment of a ball type valve according to the present invention.
Figure 10:
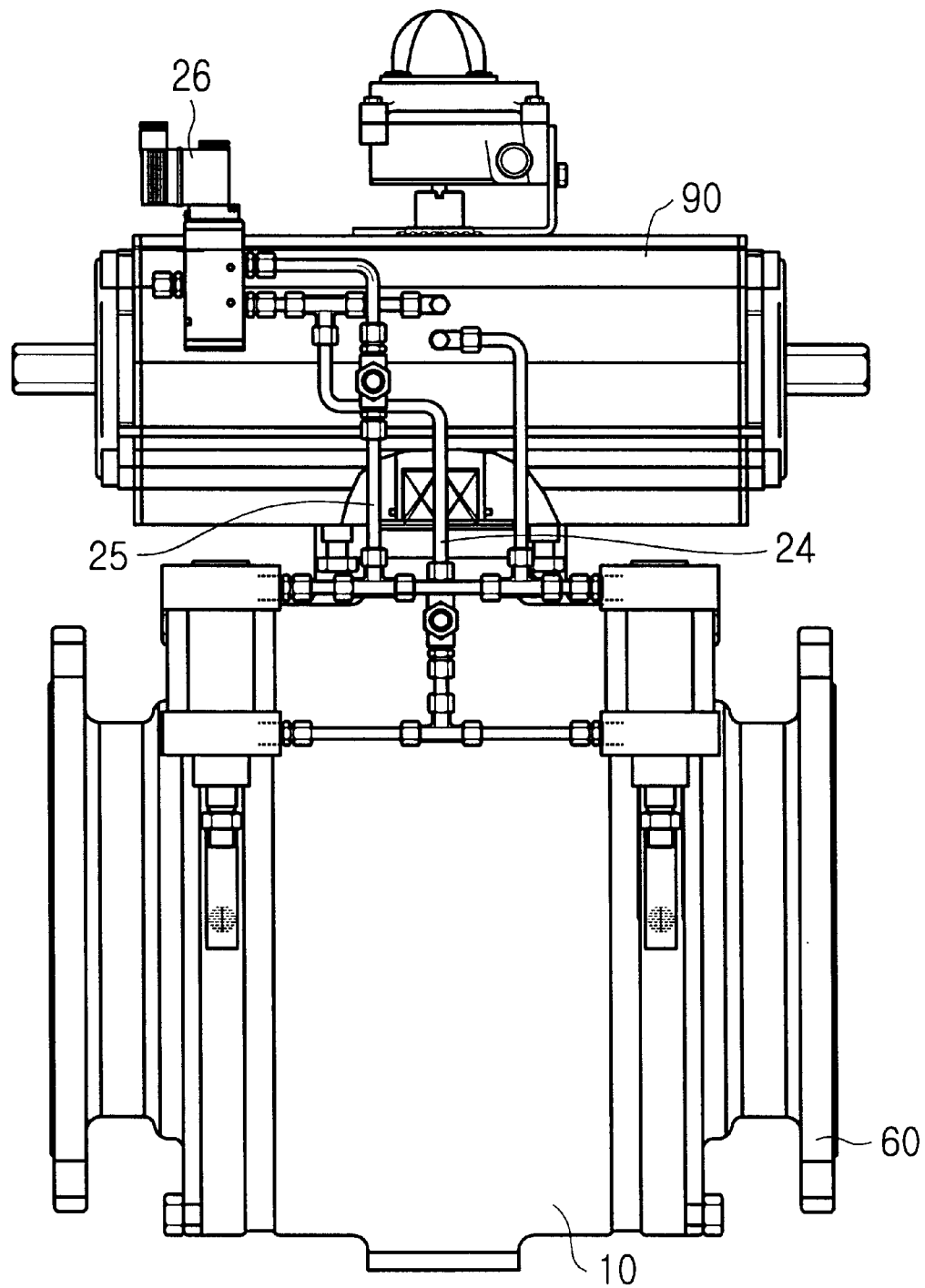
FIG. 10 is a front view showing a construction of a ball type valve according to the present invention.
Figure 11:
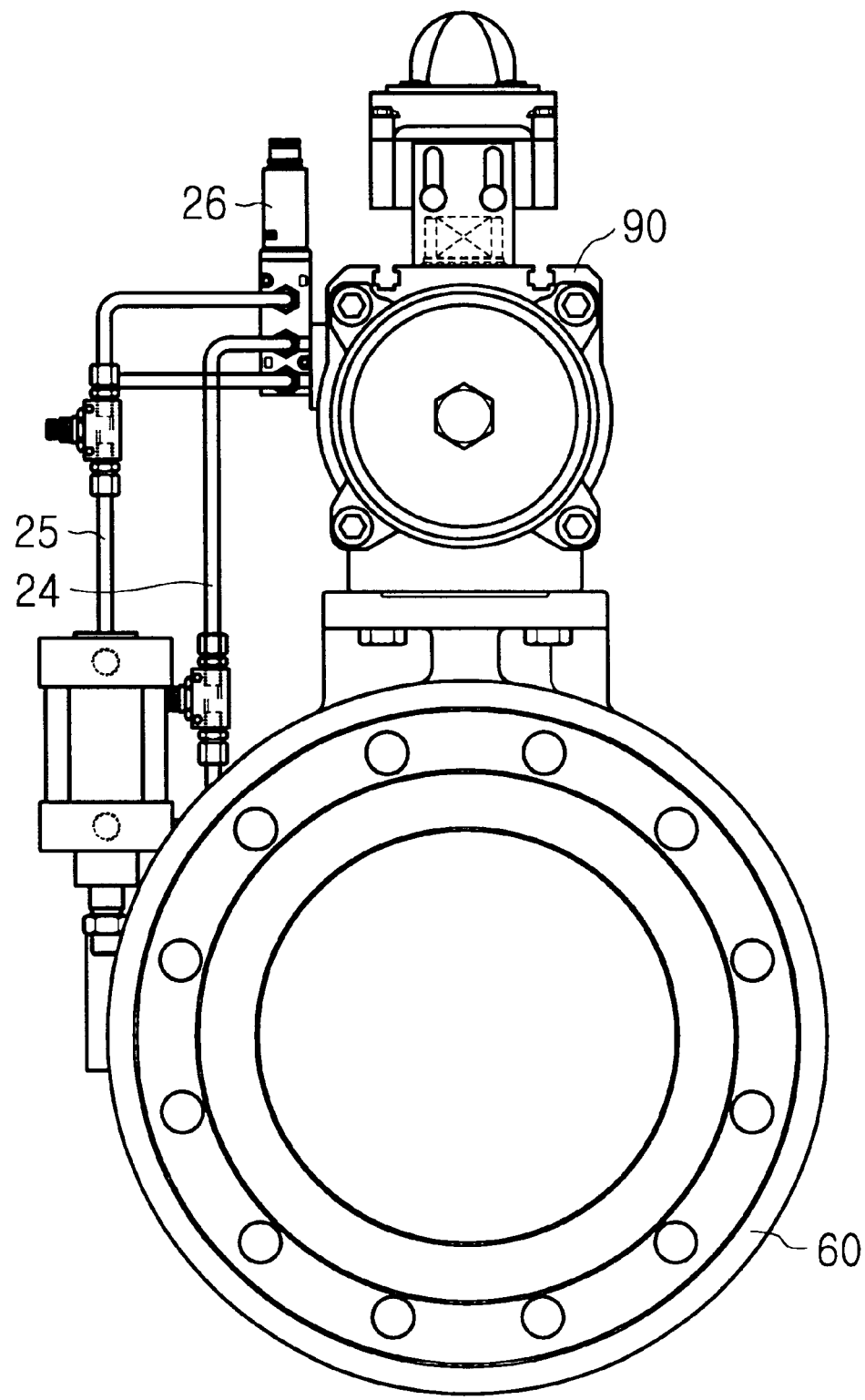
FIG. 11 is a side view showing a construction of a ball type valve according to the present invention.

As another embodiment of the above-described ball typed valve, as shown in FIG. 8, first plural permanent magnets M1 are disposed on a circumferential outer surface of the seat sliding guide 50, and second plural permanent magnets M2 are disposed on a circumferential inner surface of the side cover 60. The first and second permanent magnets M1 and M2 are arranged facing each other with the same polarity in order to maintain the ring-shaped air passage 23 using the repulsive force of the magnets M1 and M2. Here, it is preferable that the first and second permanent magnets are 48.

As shown in FIG. 8, the first air supply path 21 shown in FIGS. 7a–7c is not formed on the side cover 60 of the above-described embodiment. Second permanent magnet M2 is disposed such that it is exposed toward the ring-shaped air passage 23, and a first permanent magnet M1 is disposed at the outer side of the seat sliding guide 50 such that it has the same polarity arrangement with the second permanent magnet M2. Here, the seat sliding guide 50 comes to be sealingly contact with the opening/closing ball 20 by the repulsive force generated between the first and second permanent magnets M1 and M2, to thereby block the open passage 11.

According to the above embodiments, when the valve is closed for a long time and the seat sliding guide maintains a sealed state with the closed opening/closing ball using a consecutive air pressure, although the air pressure decreases originally or shut off, it is possible to maintain the completely sealed state.

As another embodiment of the present invention, there is provided an operation varying the position of the seat using magnetic force.

As shown in FIGS. 9–12c, a first permanent magnet M'4 is mounted on an external circumference of the mid-cover 30, a second permanent magnet M'3 is mounted on an internal circumference of the seat sliding guide 50, a third permanent magnet M'1 is mounted on an external circumference of the seat sliding guide 50, and a fourth permanent magnet M'2 is mounted on an internal circumference of the side cover 60. Each of the first to fourth permanent magnets M'4, M'3, M'1, and M'2 has plural permanent magnets which are arranged normal to the circumferential direction. Two selected adjacent magnets arranged on one circumference have different polarity from each other. In other words, when an external polarity of one selected magnet arranged on one circumference is N, external polarity of a magnet adjacent to the selected magnet arranged on the circumference is S. Here, it is preferable that the number of each of the first to fourth permanent magnets are 48.

Further, the seat sliding guide 50 is formed with pinion 51 on the outer circumferential surface thereof. A rack 100 is provide on an upper portion of the seat sliding guide 50 so as to be engaged with the pinion 51. There is also provided a pneumatic cylinder 110 as a driving means for driving the rack 100. The pneumatic cylinder 110 is connected with an air pipe 24 and 25.

Figure 12A:
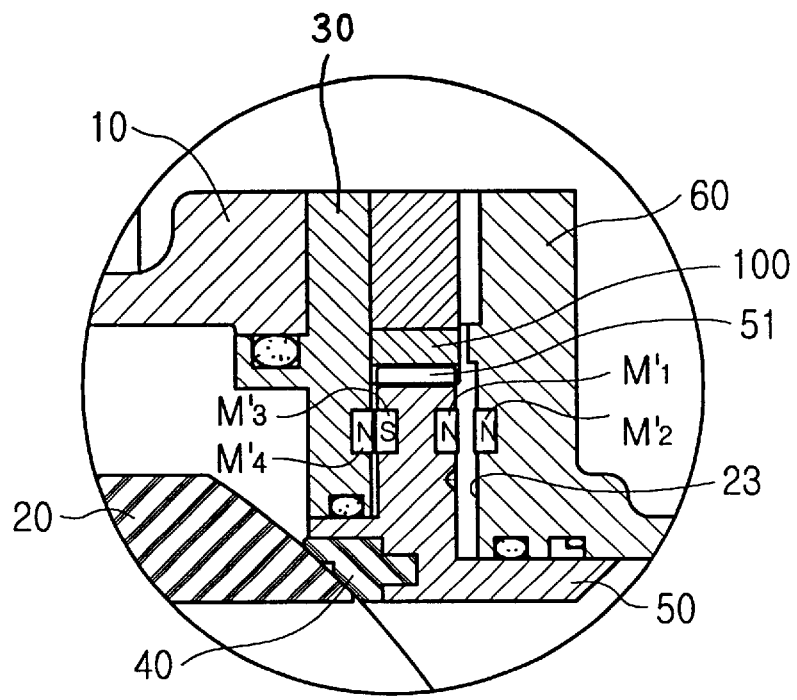
FIG. 12A is a partially enlarged view showing a state that a opening/closing ball is closely contacted with the valve seat in the embodiment according to the present invention.

Hereinafter, the operation of the other embodiment of the ball valve according to the present invention will be described. As shown in FIG. 12a, in a state that the valve is closed, an attractive force is occurred between a permanent magnet M'4 mounted on an outer side 31 of mid-cover 30 fixed to the valve body and a permanent magnet M'3 mounted on the inner side 54 of the seat sliding guide. And a repulsive force is occurred between a permanent magnet M'1 mounted on the outer side 55 of the seat sliding guide and a permanent magnet M'2 mounted on an inner side 61 of the side cover. Therefore, the valve seat 40 is pushed toward the opening/closing ball 20 by the seat sliding guide 50. The seat sliding guide 50 is apart from the side cover 60 at a desired interval.

As shown in FIG. 12a, in a state that the valve is closed, an attractive force is occurred between a permanent magnet M'4 in the valve body and a permanent magnet M'3 in the inner side of the seat sliding guide. And a repulsive force is occurred between a permanent magnet M'1 in the outer side of the seat sliding guide and a permanent magnet M'2 in the side cover. Therefore, the valve seat 40 is pushed toward the opening/closing ball 20 by the seat sliding guide 50. The seat sliding guide 50 is apart from the side cover 60 at a desired interval.

Figure 12B:
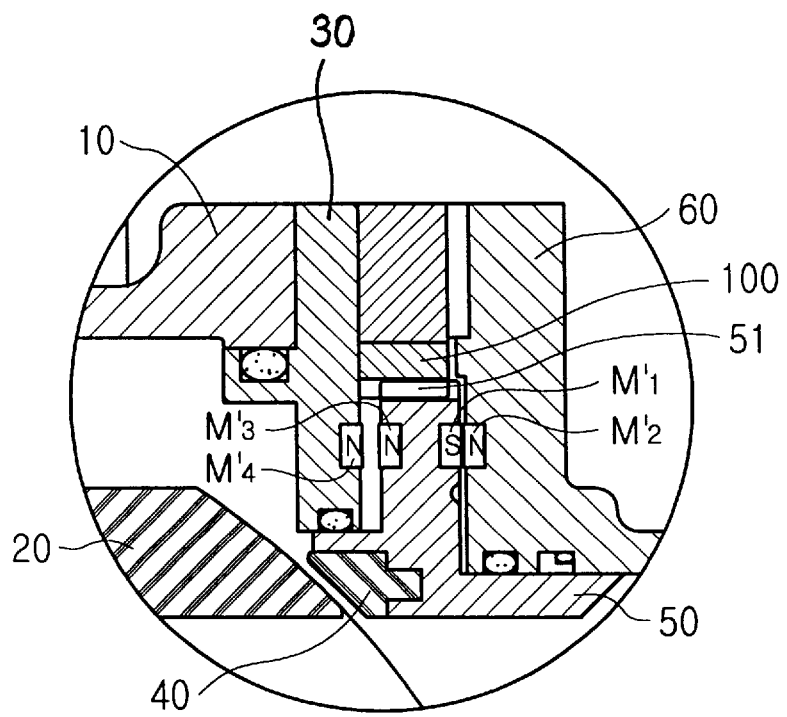
FIG. 12B is a partially enlarged view showing a state that the valve seat is varied so as to be separated from a turning radius of the opening/closing ball in the embodiment according to the present invention.

In this situation, if the solenoid valve 26 is operated so that air is supplied through the second air pipe 25 to the pneumatic cylinder 110, the rack 100 is moved to a desired pitch by a driving force of the pneumatic cylinder 110, whereby the valve is opened. At this time, the length of the moving pitch of the rack 100 is correspondent to the distance between the two adjacent permanent magnets. Due to the movement of the rack 100, the seat sliding guide 50 having the pinion 51 which is engaged with the rack 100 is rotated by one pitch. When the seat sliding guide 50 is rotated by one pitch, the permanent magnets M'3 and M'1, which are respectively mounted on the inner and outer sides 54 and 55 of the seat sliding guide 50, are moved and arranged as shown in FIG. 12b. Therefore, the permanent magnets M'3 and M'1 are respectively opposite to the permanent magnets M'4 and M'2. That is, the polarities of the permanent magnets M'3 and M'1 corresponding to the permanent magnets M'4 and M'2 are changed.

Accordingly, there is occurred the repulsive force between the permanent magnets M'4 of the valve body and the permanent magnets M'3 mounted on the inner side 54 of the seat sliding guide. And there is occurred the attractive force between the permanent magnets M'1 mounted on the outer side 55 of the seat sliding guide and the permanent magnets M'2 mounted on the inner side 61 of the side cover. Therefore, the seat sliding guide 50 is moved outward. The valve seat 40, which is fixed to the seat sliding guide 50, is aprat from the outer surface 20b of the opening/closing ball 20 at a desired distance, thereby being placed out of the turning radius of the opening/closing ball.

Figure 12C:
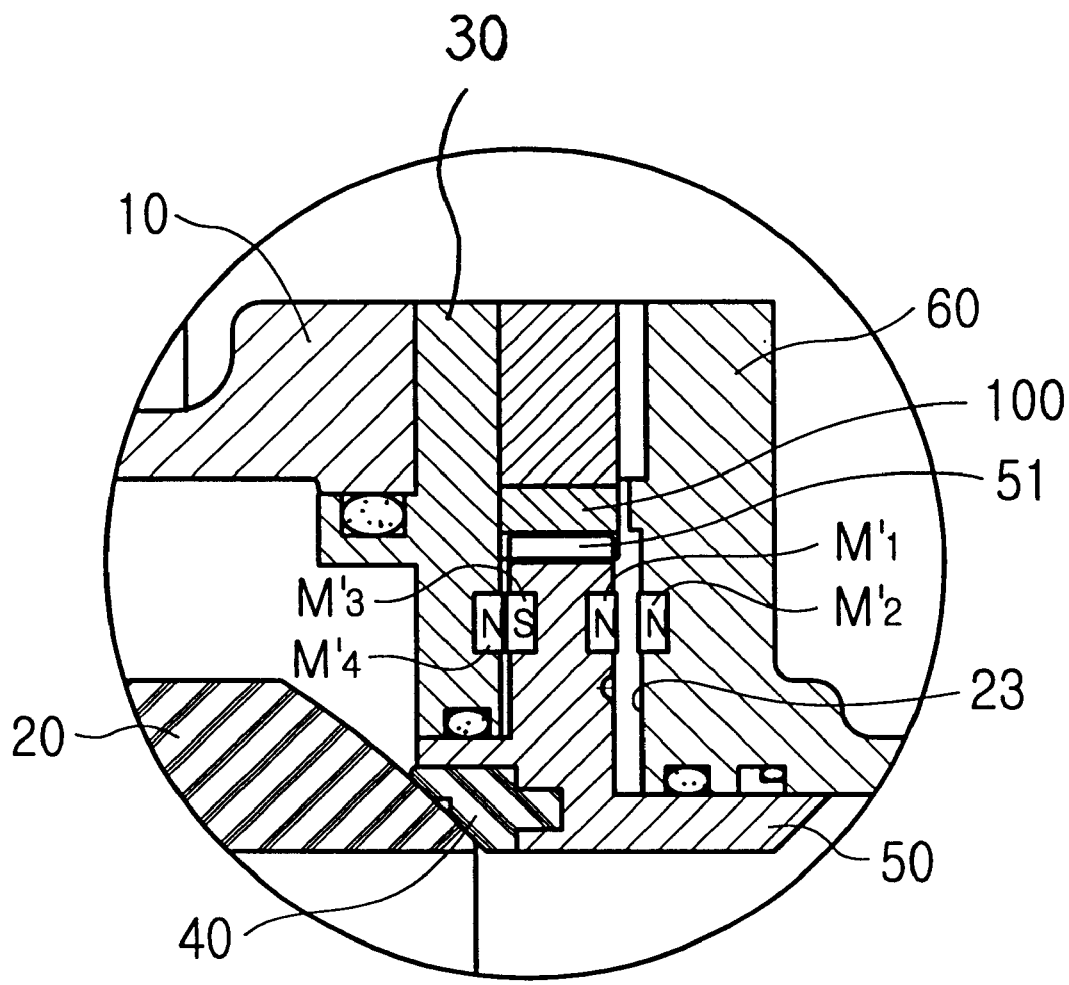
FIG. 12C is a partially enlarged view showing a state that the opening/closing ball is rotated so as to open the valve in the embodiment according to the present invention.
Figure 13:
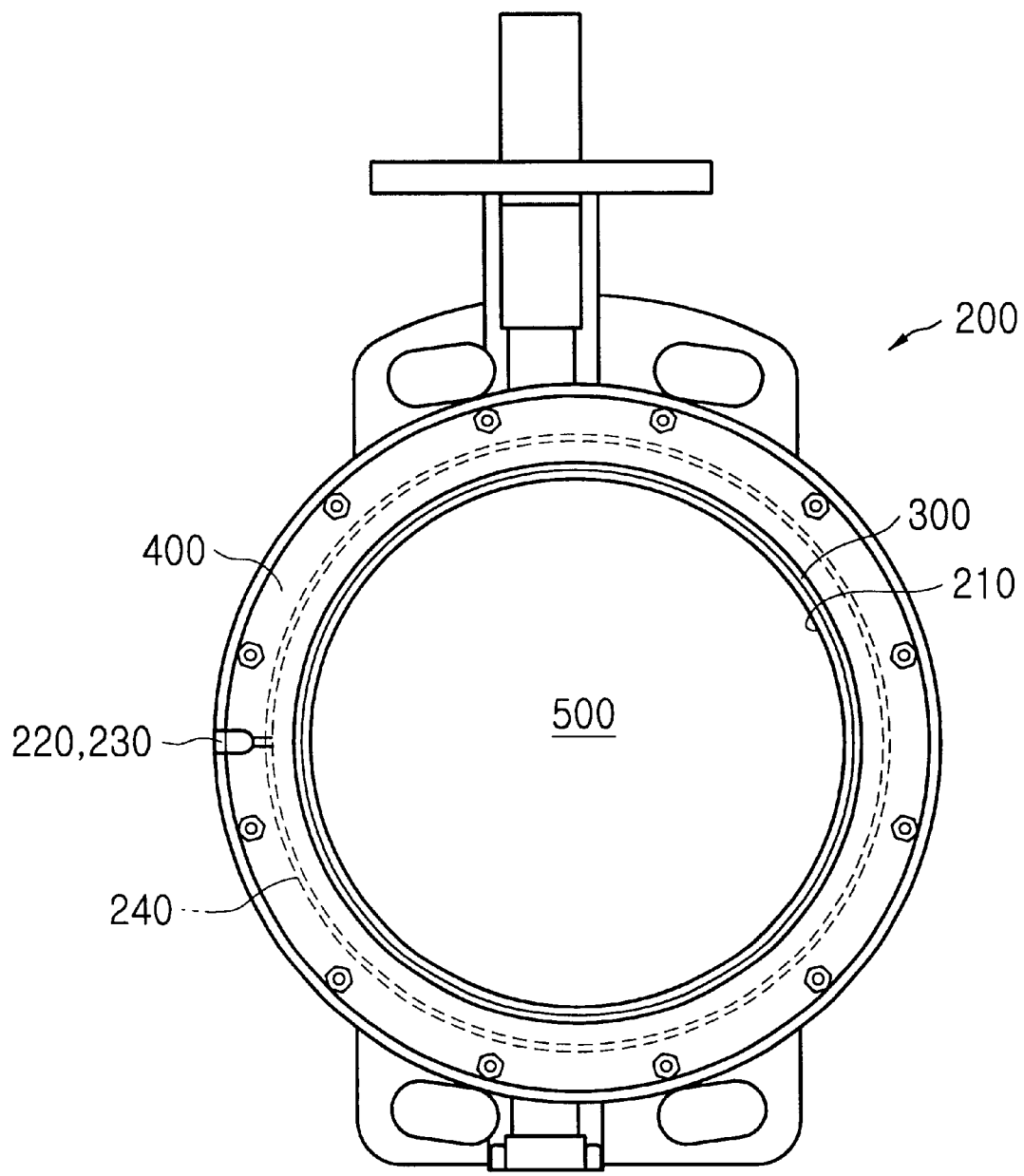
FIG. 13 is a front view of a disk type valve according to the present invention.
Figure 14:
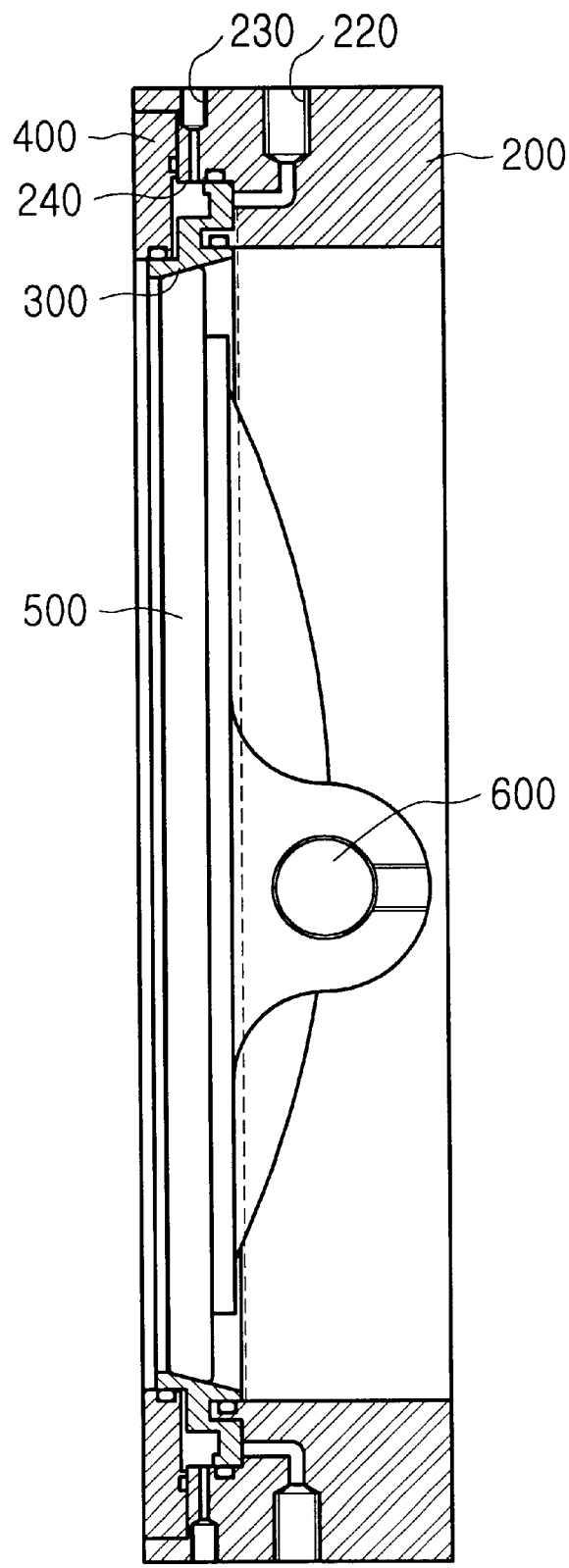
FIG. 14 is a cross-sectional view showing an open state of the disk type valve in FIG. 13.
Figure 15:
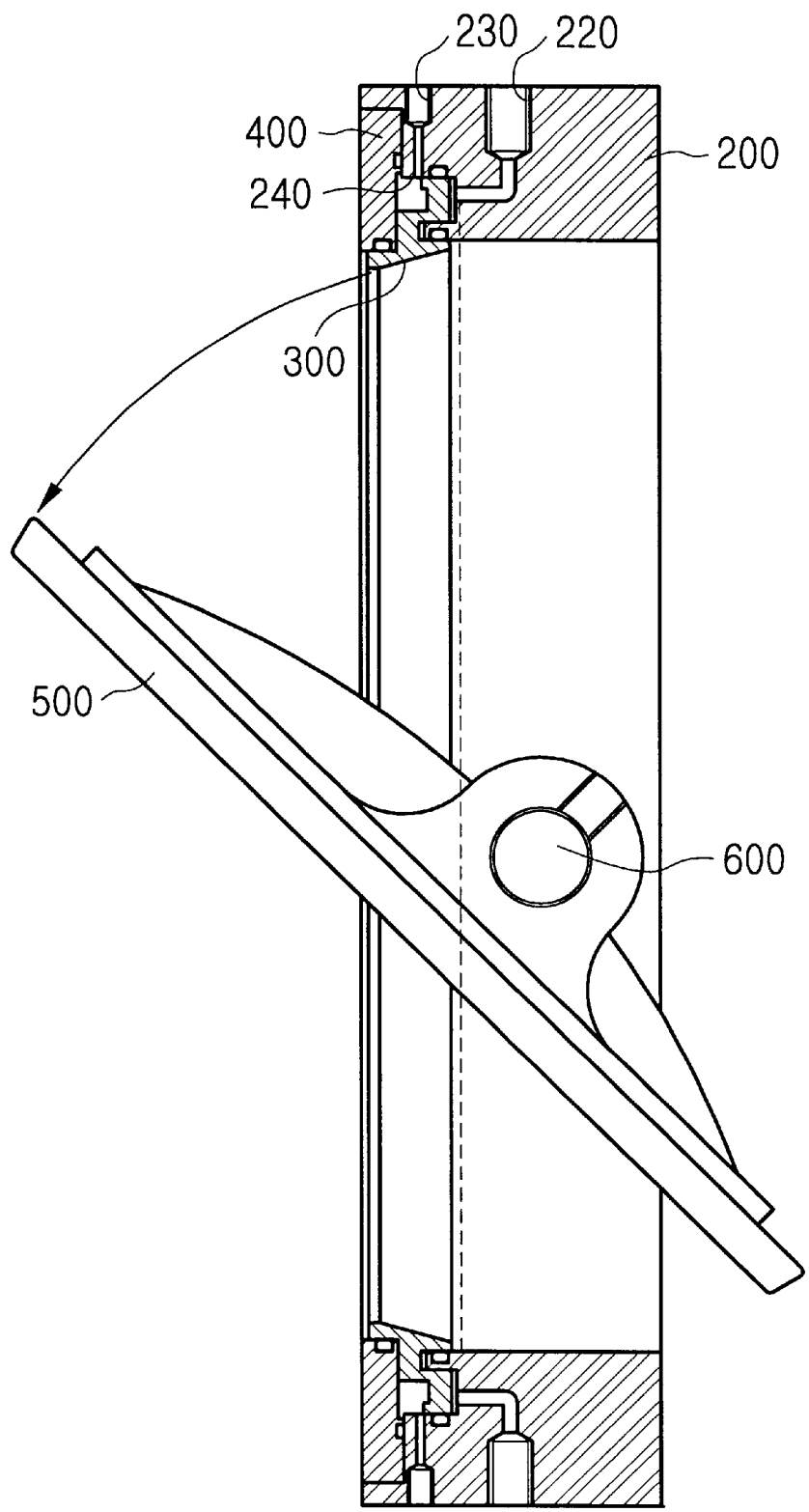
FIG. 15 is a cross-sectional view showing a closed state of the disk type valve in FIG. 13.
Figure 16A:
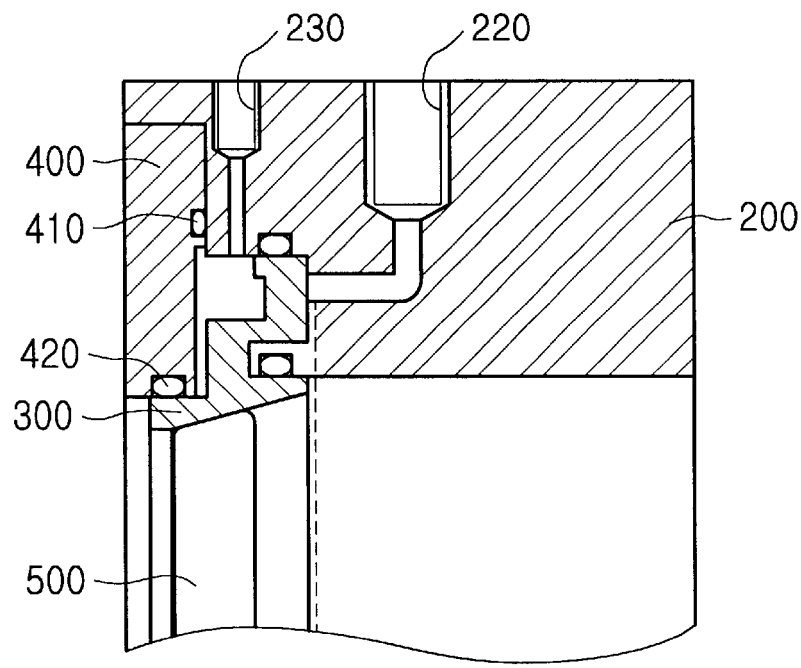
FIG. 16A is a partially enlarged view showing a state that a disk is closely contacted with the valve seat in FIG. 13.
Figure 16B:
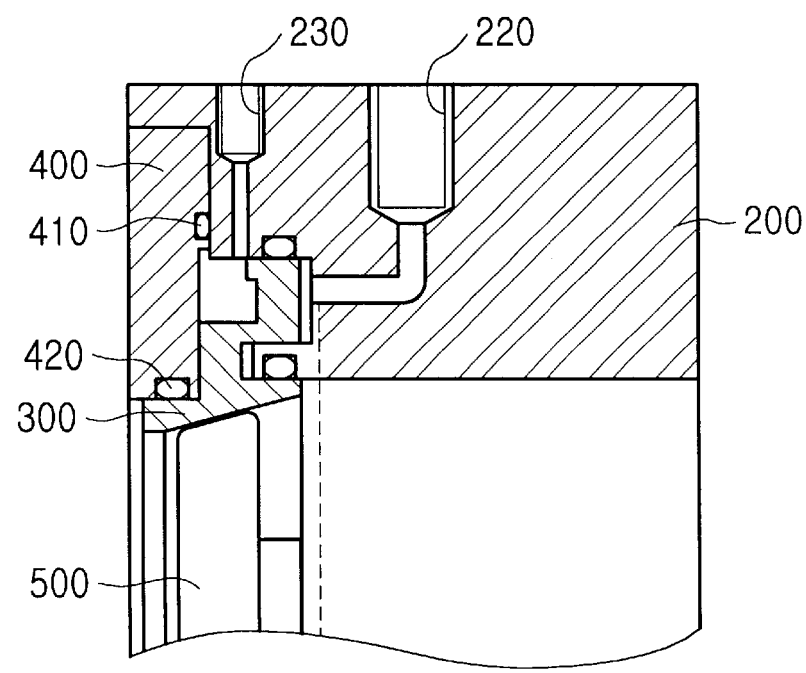
FIG. 16B is a partially enlarged view showing a state that the valve seat is varied so as to be separated from a turning radius of the opening/closing ball in FIG. 13.
Figure 16C:
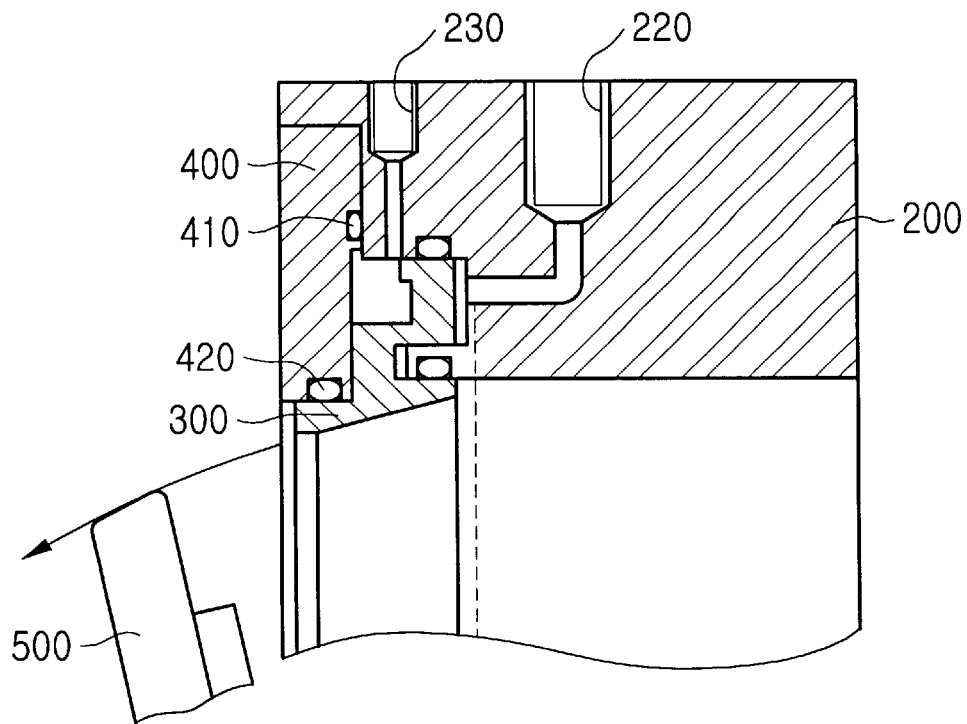
FIG. 16C is a partially enlarged view showing a state that the opening/closing ball is rotated so as to open the valve in FIG. 13.

In this situation, the rotational shaft 81 and 82 is rotated by the operation of the actuator 90 so that the opening/closing ball 20 is rotated without any contact with the inner surface of the seat 40. Therefore, as shown in FIG. 12c, the open passage 11 of the valve body is opened.

In the state that the valve seat 40 spaced-apart from the ball 20, if the rotational shaft 81 and 82 is reversely rotated so that the opening/closing ball 20 is reversely rotated, the open passage 11 of the valve body is blocked by the outer face 20b of the opening/closing ball 20. The solenoid valve 26 converts the direction of the supplying air so that the air is not supplied to the second pipe 25. The air is supplied through the first air pipe 24 to the pneumatic cylinder 110. The rack 100 is reversely moved. Therefore, when the seat sliding guide 50 is reversely rotated by a desired pitch, the positions of the permanent magnets M'3 and M'1 mounted on the inner and outer sides 54 and 55 of the seat sliding guiding 50 are changed. Therefore, the repulsive force and the attractive force are changed so that the seat sliding guide 50 is moved to the inner side of the valve body 11. The valve seat 40 fixed to the seat sliding guide 50 is closely contacted with the outer face of the opening/closing ball. And as shown in FIG. 12a, the valve is closed.

As described as above, in such a manner that the position of the valve seat of the ball valve is varied by a magnetic force, there is an advantage that the opening/closing state of the ball valve can be maintained for a long time regardless of the change in its circumstances.

In the above embodiment, the valve seat 300 is moved by the air supplied to the first and second air supplying passages 220,230 when the opening/closing disk 500 is operated to open/close the fluid passage 210 of the valve body 200, whereby the disk valve is operated.

Figure 17:
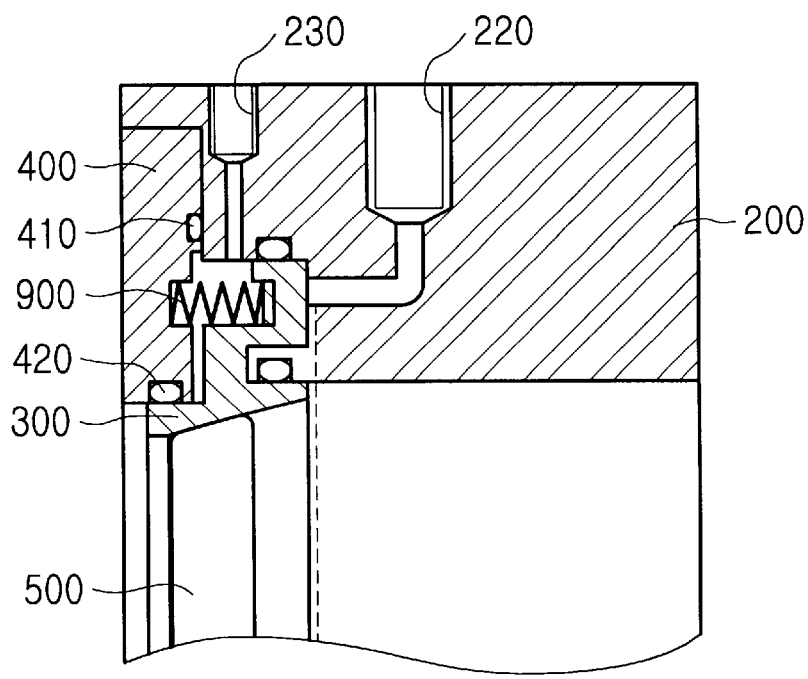
FIG. 17 is a partially enlarged view showing other embodiment of the disk type valve according to the present invention.

FIG. 17 is a modified embodiment of the disk valve apparatus according to the present invention. In this embodiment, an elastic member 900 can be interposed between the seat 300 and the circular cover ring 400.

It will be apparent to those skilled in the art that various modifications and variations of the present invention can be made without departing from the spirit or scope of the invention. Thus, it is intended that the present invention cover the modifications and variations of this invention provided they come within the scope of the appended claims and their equivalents.

What is claimed is:

1. A method for opening/closing a valve, comprising the steps of:
  providing a valve body, a rotating member disposed within said valve body, a first actuator coupled to said rotating member through said valve body and rotating said rotating member to close and open said valve, a seat member disposed adjacent to said rotating member, and a second actuator communicated with said seat member to move said seat member toward and away from said rotating member;
  rotating said rotating member in a first direction for opening said valve;

rotating said rotating member in a second direction for closing said valve;

moving said seat member to be contacted with said rotating member closing said valve;

providing a plurality of magnetic members mounted on both sides of said seat member and a side of said valve body facing said side of said seat member; and moving said seat member so that a first polarity and a second polarity of said magnetic members are located to face each other.

2. An apparatus for opening/closing a valve, comprising:

a valve body including a shaft connected to a first actuator;

a rotating member rotatably mounted within said valve body, coupled to said shaft, rotated in a forward or reverse direction by said first actuator connected to said shaft so that said valve is opened or closed;

a second actuator;

a cover connected to said second actuator, attached to a side of said valve body, having a space communicated with said actuator;

a seat member disposed between said rotating member and said cover, moving by said second actuator toward said rotating member to hold said rotating member, moving by said second actuator away from said rotating member to release said rotating member; and first and second permanent magnets respectively provided on a side of said seat member and a side of said cover.

3. The apparatus of claim 2, wherein polarities of said first and second permanent magnets disposed adjacent to each other are different.

4. The apparatus of claim 2, with said seat member comprising:

a guide disposed within said space of said cover to slidably move by said second actuator; and a seat coupled to said guide, disposed adjacent to said rotating member to be engaged with and disengaged from said rotating member.

5. The apparatus of claim 2, wherein said seat member moves by said second actuator toward said rotating member when said valve is closed while said seat member moves by said second actuator away from said rotating member when said valve is opened.

6. The apparatus of claim 2, wherein said rotating member rotates by said first actuator when said rotating member is released from said seat member by said second actuator.

7. The apparatus of claim 2, said first and second magnets being a permanent magnet.

8. The apparatus of claim 7, wherein polarities of said first and second magnets are different.

9. The apparatus of claim 7, wherein said second actuator moves said seat member by a distance between said first and second magnets.

10. The apparatus of claim 2, further comprising third and fourth magnets both mounted on a side of said valve body and another of said seat member.

11. The apparatus of claim 10, wherein both sides of said seat member face said side of said valve body and said side of said cover, respectively.

12. The apparatus of claim 2, wherein said space is disposed between said valve body and said cover.

13. The apparatus of claim 2, wherein polarities of said first and second magnets disposed adjacent to each other are same.

14. An apparatus for opening/closing a valve, comprising:

a valve body having a shaft connected to a first actuator, having a first passage formed inside of said value body and having an axis passing through a longitudinal center line of said first passage;

a rotating member rotatably mounted within said first passage of said valve body, coupled to said shaft, rotated in an opening direction or a closing direction by said first actuator connected with said shaft so that said first passage is opened or closed;

a second actuator;

a cover connected to said second actuator attached to a side of said valve body, having a plurality of second passages communicated with said actuator; and a seat member disposed between said rotating member and said cover to move in a holding direction and a releasing direction which are perpendicular to said axis of said first passage, having a guide disposed between said second passages of said cover, having a seat coupled to said guide and disposed adjacent to said rotating member, said second actuator moving said guide and said seat in said holding direction contacting a distal end surface of said rotating member and in said releasing direction to release said rotating member, said rotating member being a plate without a hole communicating with said first passage, said rotating member disposed to block said first passage when said seat member is in said holding position.

15. The apparatus of claim 14, further comprising an elastic member provided in one said second passages.

16. The apparatus of claim 15, wherein one of said second passages is disposed between said valve body and said guide of said seat member while the other one of said passages is disposed between said cover and said guide of said seat member.

17. The apparatus of claim 14, said seat member moving in said holding direction and said releasing direction perpendicular to said axis of said passage.

18. An apparatus for opening and closing an valve, comprising:

a shaft adapted to be coupled to a first actuator;

a valve body having a first passage and an axis passing through a longitudinal center line of said first passage;

a rotating member disposed within said first passage of said valve body, coupled to said shaft through said valve body, rotating about said shaft, moving by said shaft an open position for opening said first passage and a closed position for closing said first passage;

a cover attached to said valve, having a second passage adapted to communicate with a second actuator; and a seat member disposed in a space formed between said rotating member and said cover to contact and be released from said rotating member, said seat member moving along said space by said second actuator in a holding direction for contacting and holding said rotating member and in a releasing direction for disengaging from said rotating member, wherein said holding direction and said releasing direction are not parallel to said axis of said first passage.

19. The apparatus of claim 18, said rotating member being a plate of disk shape.

20. The apparatus of claim 18, wherein one of said holding direction and said releasing direction is perpendicular to said axis of said first passage.

* * * * *